United States Patent [19]

Cook

[11] Patent Number: 5,538,032
[45] Date of Patent: Jul. 23, 1996

[54] AUTOMATIC BACK WATER VALVE SYSTEM

[76] Inventor: William H. Cook, 1401 Erika Dr., Springfield, Ohio 45503

[21] Appl. No.: 377,196

[22] Filed: Jan. 24, 1995

[51] Int. Cl.$^6$ ................................................ F16K 3/02
[52] U.S. Cl. ................ 137/362; 137/505; 137/505.21; 137/505.26; 251/327
[58] Field of Search .................................. 137/362, 505, 137/505.21, 505.22, 505.26; 251/61, 327

[56] References Cited

U.S. PATENT DOCUMENTS

| | | |
|---|---|---|
| 1,685,932 | 10/1928 | Andersson . |
| 1,991,081 | 2/1935 | Charpier . |
| 2,431,399 | 11/1947 | Hull .................................... 137/362 |
| 2,904,064 | 9/1959 | Davis . |
| 3,115,890 | 12/1963 | Greenbaum ..................... 137/362 X |
| 3,213,764 | 10/1965 | Nelson et al. ....................... 251/61 X |
| 3,486,731 | 12/1969 | Magnani et al. .................... 251/61 X |
| 4,187,873 | 2/1980 | Mehoudar .................... 137/505.18 X |
| 4,257,447 | 3/1981 | Clarkson ............................ 251/327 X |
| 4,432,388 | 2/1984 | Rest .................................... 137/362 X |
| 4,637,425 | 1/1987 | Petersen . |

Primary Examiner—Stephen M. Hepperle
Attorney, Agent, or Firm—Jacox, Meckstroth & Jenkins

[57] ABSTRACT

A valve body is formed in two half sections which are secured together to define a drain line passage and to confine therebetween a thin gate valve blade for movement between a lower open position and an upper closed position. A cylindrical bellows is sealed to the valve body above the passage and is covered by circular top plate which is connected by a rod to the valve blade. The bellows defines an expandable fluid chamber connected by a bottom port to the drain line passage. The valve body is connected within a sewage drain line extending under a floor. In the event sewage water backs up within the drain line, air within the bellows is compressed to expand the bellows upwardly for closing the valve. When the sewage water drains from the drain line, the air pressure reduces, and the bellows collapses due to the weight of the top cover plate and automatically returns the valve blade downwardly to its open position.

17 Claims, 1 Drawing Sheet

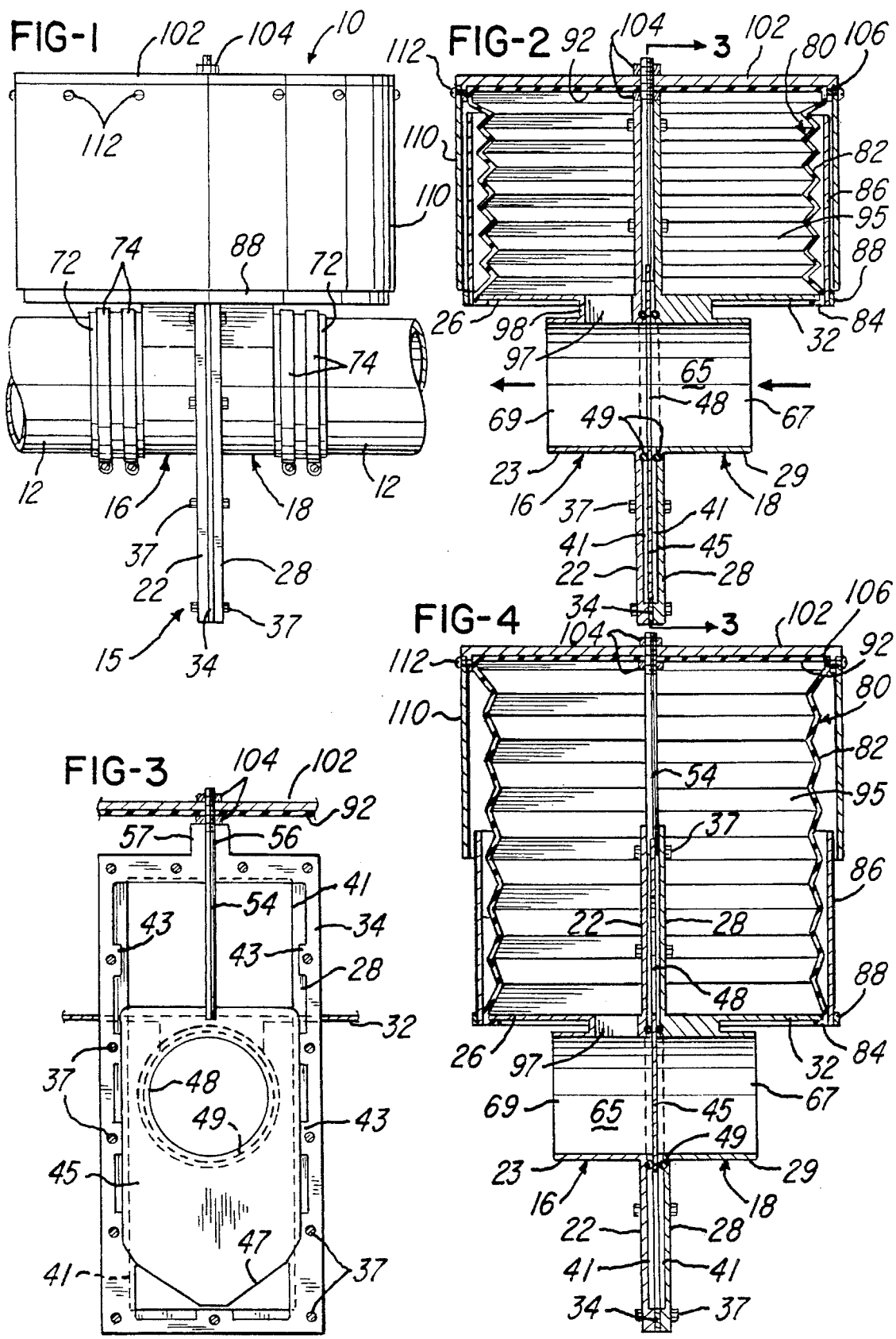

5,538,032

1

AUTOMATIC BACK WATER VALVE SYSTEM

BACKGROUND OF THE INVENTION

In the art of back water check valves for installation in a sanitary sewer line, for example, as disclosed in U.S. Pat. Nos. 1,991,081, No. 2,904,064 and 4,637,425, various designs have been proposed or used for automatically closing a valve member in the event that sewage water backs up within the drain line. This prevents the sewage water from backing up into the building.

As disclosed in U.S. Pat. No. 1,991,081, a float member is used to sense the water level within the drain line, and the float member operates a controller for controlling a reversible motor which opens and closes a gate valve. In U.S. Pat. No. 2,904,064, a back water valve includes a gate valve member which is spring loaded in an open position, and a float senses the elevated water within the drain line and releases or trips the gate valve member for closing in the event the float is elevated by water backing up in the drain line. U.S. Pat. No. 4,637,425 discloses a flapper-type check valve which has a pivoting valve member. The valve member is pivoted to a closed position by a spring actuated rod which is released from its cocked position by actuation of a solenoid controlled by a float actuated switch. After the backed up water drains from the sewer line, the check valves are manually reset. Other types of fluid actuated gate valves have also been constructed or proposed, for example, as disclosed in U.S. Pat. No. 1,685,932.

In any such back water valve for use in a sanitary sewer line extending from a building, it is desirable for the valve to be simple and economical in construction, be dependable and reliable in operation, be easy to assemble and install, avoid any flow restriction in the drain line when valve is open, and be automatic in operation. That is, it is desirable for the valve to close positively when water backs up in the sewer line and then automatically open when the sewer line is again open for use. After analyzing the back water valves or check valves disclosed in the above patents, it is apparent that none of the valves provide all of the desirable features mentioned above.

SUMMARY OF THE INVENTION

The present invention is directed to an improved back water valve which is ideally suited for installation within a sewer line located under the floor of a building and which provides all of the desirable features and advantages mentioned above. In accordance with one embodiment of the invention, a back water valve includes a valve body formed by two mating and opposing body sections which are substantially identical and are coupled together to define a straight through drain line passage having an inlet and an outlet. The body sections confine therebetween a thin metal gate valve blade member which is supported for vertical reciprocating movement between a lower position which opens the passage and an upper position which closes the passage.

The valve body sections form a circular wall above the passage and which is sealed to the lower end portion of a cylindrical flexible bellows defining an expandable chamber. The upper end portion of the bellows is closed and receives a circular top cover plate which mounts on the upper end portion of an actuating rod having a lower end portion secured to the top of the blade member. Telescopic cylindrical walls surround the bellows for protection, and the bottom of the bellows chamber is connected to the passage by a port or opening defined in the outlet body section.

When the back water valve is installed, the bellows is normally in a collapsed position, and the valve blade member is in its lower open position. When sewage water backs up within the drain line, the fluid pressure within the bellows increases to expand the bellows and shift the blade member to its upper closed position blocking the drain line passage. When tile drain line is subsequently opened and sewage water drains through tile drain line, the fluid pressure within the bellows decreases so that the bellows collapses due to the weight of the top cover plate and automatically returns the blade member to its lower open position.

Other features and advantages of the invention will be apparent from the following description, the accompanying drawing and the appended claims.

BRIEF DESCRIPTION OF THE DRAWING

FIG. 1 is a side elevational view of a back water valve constructed in accordance with the inventions and showing the valve installed within a drain line;

FIG. 2 is an axial vertical section of the back water valve of FIG. 1 and shown in the open position;

FIG. 3 is a fragmentary section taken generally on the line 3—3 of FIG. 2; and

FIG. 4 is a vertical section similar to FIG. 2 and showing the back water valve in its closed position.

DESCRIPTION OF THE PREFERRED EMBODIMENT

FIG. 1 illustrates a back water valve system 10 constructed in accordance with the invention and installed within a conventional four inch sewer line 12 which may be plastic or cast iron. The valve 10 includes a valve body 15 which is formed by two mating and opposing body sections 16 and 18. Each of the body sections is shown as constructed of cast metal but may also be injection molded of a rigid plastics material. The body section 16 includes a generally flat rectangular wall 22 from which projects a cylindrical outlet coupling portion 23 and a semi-circular top wall 26. Similarly, the valve body section 18 includes a generally flat rectangular wall 28, a cylindrical inlet coupling portion 29 and a semi-circular top wall 32.

A frame-like stainless steel spacer plate 34 is confined or sandwiched between the walls 22 and 28 with suitable gaskets or sealing mastic, and the walls 22 and 28 are secured together by peripherally spaced bolts 37. Each of the walls 22 and 28 defines a shallow rectangular cavity 41 (FIG. 2), and the spacer plate 34 is provided with inwardly projecting tabs 43 (FIG. 3) which cooperate with the walls 22 and 28 to form a track or channel for a sliding stainless steel gate valve blade member 45. The blade member 45 is generally rectangular with a V-shaped lower edge surface 47 and a circular hole or opening 48 within its upper portion. A pair of resilient O-rings 49 are confined within corresponding annular grooves within the opposing faces of the walls 22 and 28 and form fluid-tight seals with the sliding blade member 45. An actuating rod 54 has a lower end portion with a slot for receiving the upper end portion of the blade member 45 and is secured by welding to the blade member. The rod 54 projects upwardly through a cylindrical bore 56 defined by the walls 22 and 28 and between the upper end portions 57 of the spacer plate 34.

When the valve body sections 16 and 18 are coupled together by the bolts 37 and with the spacer plate 34 and sliding blade member 45 confined between the walls, the cylindrical coupling portions 23 and 29 define a drain line passage 65 having an inlet 67 and an outlet 69. The cylindrical coupling portions 23 and 29 are each connected to an opposing section of the drain line 12 by a resilient rubber coupling sleeve 72 and a pair of circumferentially extending hose or band clamps 74.

A generally cylindrical bellows 80 is molded of a non-elastic flexible rubber or plastics material and has a side wall 82 with a zig-zag corrugated cross-sectional configuration. The wall 82 has a lower end portion 84 which surrounds the circular wall formed by the mating semi-circular wall sections 26 and 32, and a cylindrical stainless sheet steel shroud 86 surrounds the wall 82 and tightly surrounds the lower end portion 84 of the wall 82. A cylindrical band clamp 88 surrounds the lower end portion of the sheet metal shroud 86 and compresses the lower end portion of the bellows wall 82 against the circular wall sections 26 and 32 to form a fluid-tight seal.

The bellows 80 has an integrally molded top wall 92 which cooperates with the side wall 82 and the wall sections 26 and 32 to define an expandable fluid chamber 95 which surrounds the upper portions of the connected flat body walls 22 and 28. The chamber 95 is connected to the drain line passage 65 by a port or opening 97 formed within in a boss 98 at the top of the outlet coupling portion 23.

The top wall 92 of the bellows 80 is covered by a circular top plate 102 which is cast of metal and has a predetermined weight, for example, about 20 pounds. The center portion of the plate 102 is rigidly connected to the upper threaded end portion of the actuating rod 54 by a pair of lock nuts 104. The top plate 102 has a downwardly projecting peripheral flange 106 which receives the upper end portion of a cylindrical stainless sheet steel shroud 110 having an inside diameter slightly larger than the outside diameter of the shroud 86. A series of peripherally spaced screws 112 secure the shroud 110 to the cover plate flange 106. In place of the telescopic shrouds 86 and 110, an inverted metal or plastic container or enclosure may be mounted on the outer edge portion of the wall sections 26 and 32 and cover the bellows 80 and top plate in their expanded position (FIG. 4).

In operation, when the back water valve 10 is installed in the sewage drain line 12, the valve is normally in the open position (FIG. 2). In this position, the bellows 80 is in its collapsed position (FIG. 2) and the gate valve blade member 45 is in its downward open position when the opening 48 is aligned with the passage 65. When sewage water backs up and fills the line 12, the water flows upwardly through the port 97 and into the chamber 95 to compress the air trapped within the chamber 95. As the head or pressure on the back water increases and the water level goes up within the chamber 95, the air pressure within the upper portion of the chamber increases sufficiently to lift the top plate 102 and pull the gate valve blade member 45 upwardly until it reaches its closed position (FIG. 4). In this closed position, the bellows 80 is fully expanded and the air pressure within the upper portion of the chamber 95 is sufficient, for example, over 0.25 psi, to hold the valve 10 in its closed position where the blade member 45 engages the upper end portion of the spacer plate 34. When the valve 10 is closed, any further increase in the fluid pressure within the backed up sewage water is blocked at the outlet 69 of the passage 65. Since the sewage drain line 12 is usually located a couple feet below a building floor surface, the back water valve 10 is effective to prevent the sewage water from backing up within the sewer line 12 to a level above the floor surface.

When the problem causing the blockage in the sewer line 12 is corrected, and the fluid pressure on the water within the line 12 decreases, the level of the water within chamber 95 descends. As the water flows from the expandable chamber 95 through tile port 97 into the passage 65 and line 12, the air pressure within the upper portion of the chamber 95 decreases. The weight of tile top plate 102 is then effective to collapse the bellows 80 and move the gate valve blade member 45 downwardly to its open position where sewage water is free to flow through the passage 65.

From the drawing and the above description, it is apparent that a back water valve constructed in accordance with the present invention, provides desirable features and advantages. For example, the back water valve 10 is simple, compact and economical in construction and also dependable in operation. In addition, tile valve operates automatically without the need for electrical power and provides no restriction to the flow of drain water when the valve is in its open position. It is further apparent that the valve body sections 16 and 18 are substantially identical except for tile opening or port 97 in the section 16. Thus when the valve body sections are cast in metal, the same mold may be used, and only the core is modified to form the port 97.

When the body sections 16 and 18 are cast in metal, the spacer plate. 34 has a thickness which is a few thousandths greater than the thickness of the gate valve blade member 45. This is preferred so that only the rectangular frame-like faces of the walls 22 and 28 require machining or surface grinding. However, if the body sections 16 and 18 are molded of a plastics material, the recess spacer plate 34 may be omitted and opposing recesses may be formed within the flat faces of the walls 22 and 28 for receiving the plate member 45 for sliding movement.

The telescopic cylindrical shrouds 86 and 110 or the inverted stationary enclosure is provided to protect the flexible bellows 80, but are not required for the performance or operation of the back water valve 10. The arrangement of the gate valve blade member 45 with a lower open position and an upper closed position, and its continuous contact with the O-rings 49, are also desirable. This assures that the path for the blade member 45 is always open and that the O-rings 49 form dependable fluid-tight seals when the valve is closed. The portion of the blade member 45 defining the lower half of the opening 48 may also be provided with a sharp edge in order to shear through any semi-solid material which might be within the opening 48 and interfere with the closing of the blade member. It is also apparent that a set of circumferentially spaced tension coil springs may be used outboard of the bellows 80 to connect the top plate 102 to the bottom wall sections 26 and 32 in order to reduce the weight of the top plate on wall 102.

While the form of back water valve herein described and its method of construction and operation constitute a preferred embodiment of the invention, it is to be understood that the invention is not limited to the precise method and form of valve described, and that changes may be made therein without departing from the scope and spirit of the invention as defined in the appended claims. For example, a back water/air displacement chamber may be used between the passage 65 and expandable chamber 95 so that only displaced air enters the chamber 95.

The invention having thus been described, the following is claimed:

1. A back water valve system for installing in a gravity flow sewage drain line containing air, said valve system comprising a valve body defining a water passage having an inlet and an outlet, means for connecting said inlet and outlet within the drain line, a valve member disposed between said inlet and said outlet and moveable between a retracted open position permitting water to flow through said passage and a closed position blocking the flow of water through said passage, means forming an expandable fluid chamber and including an actuator member moveable between a first position and a second position, said actuator member connected to said valve member for moving said valve member from said open position to said closed position in response to movement of said actuator member from said first position to said second position, means forming a fluid connection between said expandable chamber to said passage and drain line for receiving air within the chamber from the drain line and for increasing the fluid pressure within said chamber and moving said actuator member to said second position in response to the displacement of air and an increase of fluid pressure within said passage and drain line when water backs up in the drain line, and means for automatically moving said actuator member to said first position and said valve member to said open position in response to a reduction of fluid pressure within said passage and said chamber.

2. A valve system as defined in claim 1 where in said expandable chamber is disposed above said passage, and said valve member comprises a generally flat valve blade moveable downwardly to said open position and upwardly to said closed position.

3. A valve system as defined in claim 1 wherein said chamber forming means comprise a flexible bellows of fluid impermeable material.

4. A valve system as defined in claim 1 where in said valve member comprises a substantially thin flat valve blade, and said valve body comprises a pair of mating and opposing body sections confining therebetween said valve blade for sliding movement between said open and closed positions.

5. A valve system as defined in claim 4 wherein each of said body sections includes an upper wall forming a bottom wall for said expandable chamber.

6. A valve system as defined in claim 1 and including a weight member for urging said actuator member downwardly to said first position and said valve member to said open position.

7. A valve system as defined in claim 1 where in said valve body comprises a pair of substantially identical and opposing body sections secured together, and said valve member comprises a generally flat valve blade confined between said body sections.

8. A back water valve system adapted to be installed in a sewage drain line below a building floor, said valve system comprising a valve body including means defining a water passage having an inlet and an outlet and adapted to be connected within the drain line, a thin gate valve blade disposed between said inlet and said outlet and moveable generally vertically between a lower open position permitting water to flow through said passage and an upper closed position blocking the flow of water through said passage, means forming an expandable fluid chamber above said passage and moveable between a collapsed position and an expanded position, means connecting the upper portion of said chamber forming means to said valve blade for moving said valve blade from said lower open position to said upper closed position in response to expansion of said chamber forming means from said collapsed position to said expanded position, and means forming a port connecting said chamber to said passage for receiving air within said chamber from the drain line, and said chamber, port and passage being arranged for increasing the air pressure within said chamber and moving said chamber forming means to said expanded position in response to the displacement of air within said passage by water backing up in the drain line.

9. A valve system as defined in claim 8 wherein said chamber forming means comprise a flexible bellows of fluid impermeable material.

10. A valve system as defined in claim 8 including means for moving said chamber forming means to said collapsed position and said valve member to said open position in response to a reduction of fluid pressure within said passage and air pressure within said chamber.

11. A valve system as defined in claim 8 wherein said valve body comprises a pair of mating and opposing body sections confining therebetween said valve blade for sliding movement between said open and closed positions.

12. A valve system as defined in claim 11 wherein each of said body sections includes an upper wall forming a bottom wall for said expandable chamber.

13. A valve system as defined in claim 11 wherein said body sections are substantially identical and include aligned cylindrical portions defining said inlet and said outlet.

14. A valve system as defined in claim 8 wherein said port provides for directing backup water from said passage into said chamber and for gravity draining of backup water from said chamber into said passage.

15. A valve system as defined in claim 8 and including a weight member for urging said chamber forming means downwardly to said collapsed position and said valve member to said open position in response to a reduction of fluid pressure within said passage.

16. A back water valve system adapted to be installed in a sewage drain line below a building floor, said valve system comprising a valve body including means defining a water passage having an inlet and an outlet and adapted to be connected within the drain line, a valve member disposed between said inlet and said outlet and moveable between a retracted open position permitting water to flow through said passage and a closed position blocking the flow of water through said passage, means forming an expandable fluid chamber above said passage and moveable between a collapsed position and an expanded position, means connecting said chamber forming means to said valve member for moving said valve member from said open position to said closed position in response to movement of said chamber forming means from said collapsed position to said expanded position, and means defining at opening at the bottom of said chamber to form a fluid connection of said chamber to said passage to direct backup water from said passage into said chamber when water backs up in the drain line for increasing the fluid pressure within said chamber and moving said chamber forming means to said expanded position in response to an increase of fluid pressure within said passage and for draining backup water from said chamber into said passage and drain line.

17. A back water valve system for installing in a gravity flow sewage drain line containing air, said valve system comprising a valve body defining a water passage having an inlet and an outlet, means for connecting said inlet and outlet within the drain line, a valve member disposed between said inlet and said outlet and moveable between a retracted open position permitting water to flow through said passage and a closed position blocking the flow of water through said passage, means forming an expandable fluid chamber and including an actuator member moveable between a first position and a second position, said actuator member connected to said valve member for moving said valve member from said open position to said closed position in response to movement of said actuator member from said first position to said second position, means forming a fluid connection between said expandable chamber to said passage and drain line for receiving air within the chamber from the drain line and for increasing the fluid pressure within said chamber and moving said actuator member to said second position in response to the displacement of air and an increase of fluid pressure within said passage and drain line when water backs up in the drain line, said chamber forming means including a generally cylindrical bellows of flexible and non-elastic fluid impermeable material, and an annular protector wall surrounding said bellows and supported by said valve body.

* * * * *